(12) United States Patent
Bach

(10) Patent No.: US 11,399,223 B2
(45) Date of Patent: Jul. 26, 2022

(54) METHOD AND SYSTEM FOR COLLECTING DATA SUPPLIED BY SENSORS

(71) Applicant: DIEHL METERING S.A.S., Saint Louis (FR)

(72) Inventor: Guy Bach, Waldighoffen (FR)

(73) Assignee: Diehl Metering S.A.S., Saint Louis (FR)

(*) Notice: Subject to any disclaimer, the term of this patent is extended or adjusted under 35 U.S.C. 154(b) by 0 days.

(21) Appl. No.: 16/720,384

(22) Filed: Dec. 19, 2019

(65) Prior Publication Data

US 2020/0128309 A1 Apr. 23, 2020

Related U.S. Application Data

(63) Continuation of application No. PCT/EP2018/000298, filed on Jun. 8, 2018.

(30) Foreign Application Priority Data

Jun. 23, 2017 (FR) ........................................ 1755760

(51) Int. Cl.
*H04Q 9/16* (2006.01)
*G01D 4/00* (2006.01)
(52) U.S. Cl.
CPC .............. *H04Q 9/16* (2013.01); *G01D 4/004* (2013.01); *H04Q 2209/10* (2013.01);
(Continued)
(58) Field of Classification Search
None
See application file for complete search history.

(56) References Cited

U.S. PATENT DOCUMENTS 4,940,976 A * 7/1990 Gastouniotis .......... G01D 4/008
340/870.02
5,719,564 A * 2/1998 Sears ..................... G08C 17/02
340/10.41
(Continued)

FOREIGN PATENT DOCUMENTS

CA 2332297 A1 7/2002
CN 105471958 A 4/2016
(Continued)

*Primary Examiner* — Curtis J King
(74) *Attorney, Agent, or Firm* — Laurence A. Greenberg; Werner H. Stemer; Ralph E. Locher

(57) ABSTRACT

A method for collecting data delivered by sensors each containing a measurement element, which sensors are equipped for radio communication and include a device for storing and preparing measurement signals recorded by the respective measurement elements for the transmission of the signals, and an autonomous power source. The method includes the following steps: recording successive raw measurement data corresponding to time-stamped, elementary measurement units of at least one physical or physical-chemical variable or parameter delivered by the measurement element of a particular sensor; in each sensor concerned, storing the raw measurement data in the memory device of the sensor; transmitting the unprocessed raw measurement data in compressed form via a radio link; and collecting, storing and evaluating the raw measurement data transmitted from a multiplicity of sensors in a remote central processing facility.

22 Claims, 3 Drawing Sheets

(52) U.S. Cl.
CPC ..... *H04Q 2209/43* (2013.01); *H04Q 2209/50* (2013.01); *H04Q 2209/826* (2013.01); *H04Q 2209/88* (2013.01)

(56) References Cited

U.S. PATENT DOCUMENTS

| | | | | |
|---|---|---|---|---|
| 5,923,269 | A * | 7/1999 | Shuey | H02J 13/0062 340/870.02 |
| 6,393,341 | B1 * | 5/2002 | Lawrence | G06F 9/54 700/286 |
| 7,020,701 | B1 * | 3/2006 | Gelvin | G01D 21/00 250/332 |
| 8,378,848 | B2 * | 2/2013 | Young | G01D 4/002 340/870.07 |
| 8,548,607 | B1 * | 10/2013 | Belz | G06F 7/00 700/21 |
| 9,140,555 | B1 * | 9/2015 | Andersson | G01C 21/165 |
| 9,356,831 | B2 * | 5/2016 | Nelson | H04W 40/16 |
| 9,992,559 | B2 * | 6/2018 | Yamamoto | H04Q 9/00 |
| 2002/0180615 | A1 * | 12/2002 | Kim | G01F 15/063 340/870.02 |
| 2003/0048199 | A1 * | 3/2003 | Zigdon | H04M 15/68 340/870.02 |
| 2003/0067889 | A1 * | 4/2003 | Petite | G08B 21/18 370/310 |
| 2005/0083197 | A1 | 4/2005 | Glenn et al. | |
| 2005/0179561 | A1 * | 8/2005 | Osterloh | H04Q 9/00 340/870.02 |
| 2005/0190066 | A1 * | 9/2005 | Schleich | G01M 3/2807 340/605 |
| 2006/0066457 | A1 * | 3/2006 | Mueller | H04Q 9/00 340/870.02 |
| 2006/0281435 | A1 * | 12/2006 | Shearer | H02J 50/90 455/343.1 |
| 2007/0044093 | A1 * | 2/2007 | Banerjee | G06Q 20/203 717/176 |
| 2007/0057812 | A1 * | 3/2007 | Cornwall | H04Q 9/00 340/870.02 |
| 2008/0219210 | A1 * | 9/2008 | Shuey | G01D 4/006 370/329 |
| 2009/0009359 | A1 * | 1/2009 | Belverato | G01D 4/004 340/870.02 |
| 2009/0102680 | A1 * | 4/2009 | Roos | G06Q 20/102 340/870.02 |
| 2009/0189778 | A1 * | 7/2009 | Juan | G01D 4/006 340/870.02 |
| 2010/0023172 | A1 * | 1/2010 | Malinowski | G05B 15/02 700/283 |
| 2010/0070100 | A1 * | 3/2010 | Finlinson | H04Q 9/00 700/295 |
| 2010/0188197 | A1 * | 7/2010 | Ackley | G08C 17/02 340/10.1 |
| 2011/0112779 | A1 * | 5/2011 | Tse | G06F 17/148 702/60 |
| 2011/0184676 | A1 * | 7/2011 | Gershinsky | H04Q 9/00 702/62 |
| 2011/0188516 | A1 * | 8/2011 | Borleske | H04J 3/24 370/474 |
| 2012/0019395 | A1 * | 1/2012 | Willig | H04Q 9/00 340/870.02 |
| 2012/0158603 | A1 * | 6/2012 | Ameling | G06Q 10/06 705/317 |
| 2013/0009787 | A1 * | 1/2013 | Ree | H04L 67/12 340/870.02 |
| 2013/0106616 | A1 * | 5/2013 | Gustafsson | H04Q 9/00 340/870.02 |
| 2013/0181847 | A1 * | 7/2013 | Willig | H04L 41/12 340/870.03 |
| 2013/0229263 | A1 * | 9/2013 | Graczyk | G08B 25/08 340/10.1 |
| 2013/0307694 | A1 * | 11/2013 | Amar | G01D 4/002 340/637 |
| 2014/0097966 | A1 * | 4/2014 | Alexander | G01D 4/002 340/870.02 |
| 2014/0167978 | A1 * | 6/2014 | Popa | H04W 4/80 340/870.02 |
| 2015/0163756 | A1 * | 6/2015 | Hildebrandt | H04J 3/0602 370/350 |
| 2015/0163849 | A1 * | 6/2015 | Bauer | G01D 4/006 702/62 |
| 2015/0350748 | A1 * | 12/2015 | Abuelsaad | H04Q 9/00 340/870.07 |
| 2016/0170394 | A1 | 6/2016 | Allgaier et al. | |
| 2017/0006435 | A1 * | 1/2017 | Yamamoto | H04L 43/04 |
| 2017/0093160 | A1 * | 3/2017 | Bell | G05F 1/14 |
| 2018/0020270 | A1 * | 1/2018 | Colonna | H04L 41/28 |
| 2018/0139517 | A1 * | 5/2018 | Schwartz | H02J 50/20 |
| 2018/0191196 | A1 * | 7/2018 | Lee | G07F 15/008 |
| 2018/0337770 | A1 * | 11/2018 | Bathen | H04L 9/3297 |
| 2018/0343550 | A1 * | 11/2018 | Murai | H04W 4/38 |
| 2019/0041235 | A1 * | 2/2019 | Ko | G01D 5/00 |
| 2019/0101411 | A1 * | 4/2019 | Davis | G01F 15/063 |
| 2019/0387405 | A1 * | 12/2019 | Christiansen | H04W 4/38 |
| 2020/0035087 | A1 * | 1/2020 | Teki | G08B 17/10 |
| 2020/0213823 | A1 * | 7/2020 | Elkhail | H04L 45/46 |
| 2020/0304967 | A1 * | 9/2020 | Kuriyama | H04Q 9/00 |
| 2020/0313798 | A1 * | 10/2020 | Hald | H04L 1/1671 |
| 2020/0349661 | A1 * | 11/2020 | Dutta | G06Q 50/163 |

FOREIGN PATENT DOCUMENTS

| | | |
|---|---|---|
| CN | 105847024 A | 8/2016 |
| DE | 102015205379 A1 | 9/2016 |
| DE | 102013213040 B4 | 7/2019 |
| FR | 2984575 A1 | 6/2013 |
| WO | 2015000943 A2 | 1/2015 |

\* cited by examiner

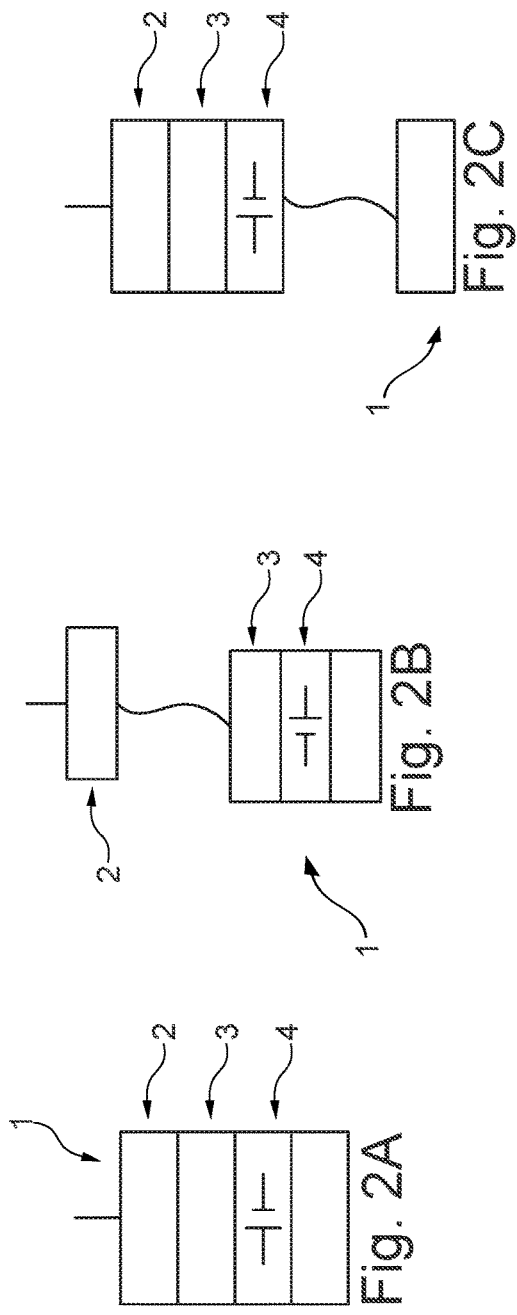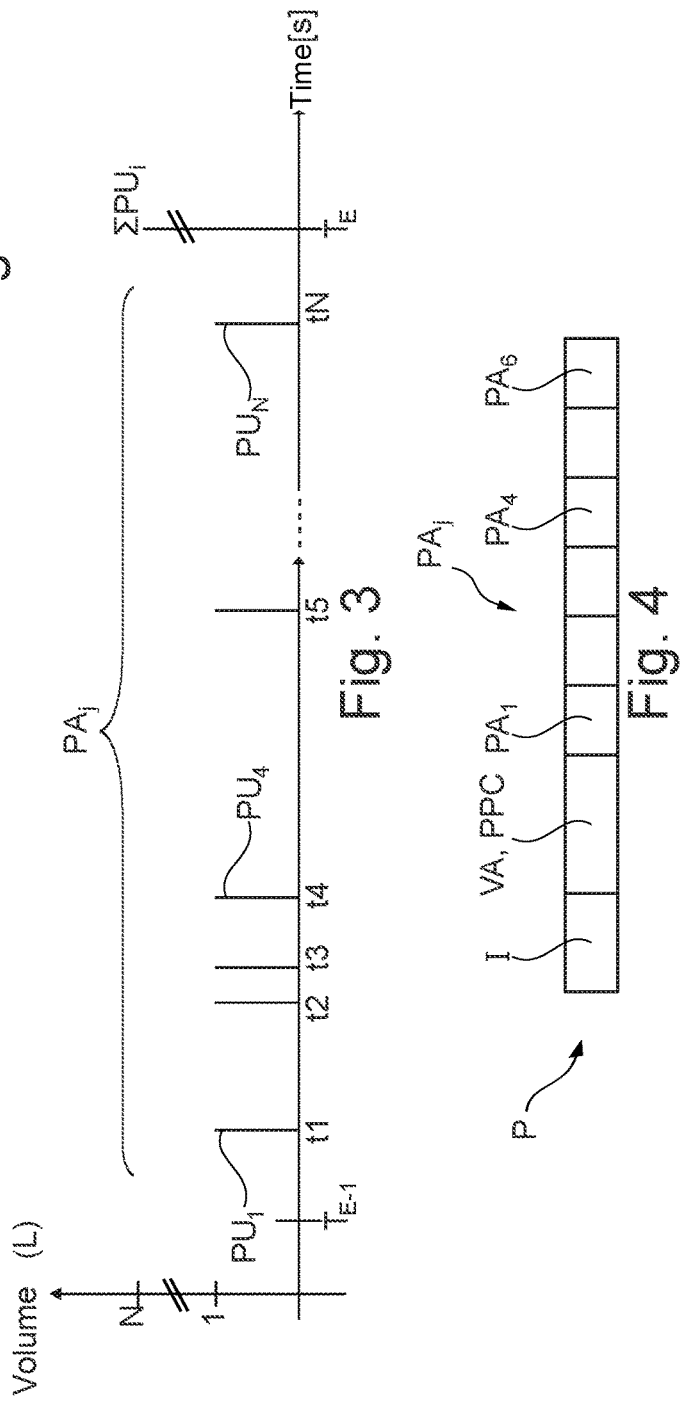

METHOD AND SYSTEM FOR COLLECTING DATA SUPPLIED BY SENSORS

CROSS-REFERENCE TO RELATED APPLICATION

This application is a continuation, under 35 U.S.C. § 120, of copending international patent application PCT/EP2018/000298, filed Jun. 8, 2018, which designated the United States; this application also claims the priority, under 35 U.S.C. § 119, of French patent application FR 1755760, filed Jun. 23, 2017; the prior applications are herewith incorporated by reference in their entirety.

BACKGROUND OF THE INVENTION

Field of the Invention

The present invention relates to the field of remote reading, i.e. the remote collection and centralization of measurement data supplied by sensors, detectors or comparable, individual, geographically dispersed and energy-autonomous means.

The invention relates more particularly to a method and a system for collection and remote reading of measurement data supplied by sensors of this type.

Today, in the field of remote reading of domestic meters via radio transmission, the raw measurement data supplied by the sensor concerned are used in situ and are processed by said sensor or its associated radio module according to the available means of analysis (software used by the microprocessor or the microcontroller of the sensor or of the radio module) and the "business" functions to be performed.

Given the diverse nature of the "business" functions required by the owners or operators and their development during the lifetime of the sensors, the electronic and computing means of each sensor/radio module unit must be sufficiently sophisticated and complex to be able to supply sufficient resources which are adaptive over time, as well as a radio link which may or may not be bidirectional (at least to allow the necessary scalability of the software means).

This causes serious problems in terms of the management of local energy consumption and therefore functional autonomy (need for repetitive maintenance, changing of batteries, replacement of the radio module, etc.) and in terms of transmission security (due to its possible bidirectionality).

Furthermore, given the nature of the transmitted data (results of local processing operations) and the development over time of the types of local processing operations carried out, the data collected over a lengthy time period may not be homogeneous in themselves, or indeed may not allow access to some information, in the form of data values, not taken into account or not considered during a preceding operating period of the sensors.

The issue of energy autonomy is even more sensitive when the uplink transmission (from the sensor to the fixed or mobile remote reading means) is implemented in a repetitive manner at regular intervals, thus incurring substantial energy expenditure for processing and transmission.

This multifaceted problem explained above arises, in particular, in connection with the measurement of the consumption in individual households (gas, water, energy, etc.) or the continuous monitoring of one or more local physical or physico-chemical parameters or quantities.

SUMMARY OF THE INVENTION

It is accordingly an object of the invention to provide a method and system for collecting and managing sensor-supplied data which overcome a variety of the above-mentioned and other disadvantages of the heretofore-known devices and methods of this general type.

With the foregoing and other objects in view there is provided, in accordance with the invention, a method for collecting data supplied by measurement sensors, installed locally and associated with radiofrequency communication means integrated into the respective sensors or forming remote modules, these sensors and/or these modules including means for storing and preparing the read values, and also an autonomous power supply source for said sensor and said communication means.

The novel method according to invention includes at least the following method steps:

reading, from each sensor concerned, successive measurement data corresponding to timestamped elementary units of measurement of at least one physical or physico-chemical quantity or parameter supplied by said sensor, storing these raw measurement data in the storage means of said sensor or said module, transmitting these data in their current state via a radiofrequency channel and in compressed form in a repetitive and conditional manner, each time after a predetermined time interval has elapsed and/or after a predetermined quantity of accumulated data has been reached since the preceding transmission, and collecting, storing and using the data transmitted by a plurality of sensors in a remote centralized processing installation.

With the above and other objects in view there is also provided, in accordance with the invention, a system for a remote reading of sensors installed in a given geographical area and for use of data thus read within the method as outlined herein. The system comprising:

a plurality of sensors, each having a device for storing and processing raw measured values for transmission functionally associated or integrated therewith;

each said sensor being configured with built-in radiofrequency communication or by way of a separate and remote module associated with said sensor;

said device for storing and processing of each said sensor or module includes a microcontroller configured to implement a compression of timestamped raw measurement data and their preparation in a format suitable for a radiofrequency transmission according to a determined protocol;

an autonomous power supply for said sensor with said built-in radiofrequency communication of said module; and at least one remote processing installation, configured for acquiring, storing and using raw data originating from said plurality of sensors of the geographical area concerned, and from other areas covering an overall territory associated with said installation;

said at least one remote processing installation including hardware and software configured to implement, on the one hand, following decompression, a use of the received raw measurement data, for reconstruction of timing charts of the values associated with each of the sensors, and the performance of business functions and, on the other hand, a cumulative storage of the raw data and possibly the data resulting from the processing operations originating from all of the sensors of the connected networks, and the corresponding profiles, over a lengthy time period.

Other features which are considered as characteristic for the invention are set forth in the appended claims.

Although the invention is illustrated and described herein as embodied in a method and system for collecting data supplied by sensors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 2A to 2C are schematic views of two exemplary embodiment variants of a sensor/radiocommunication unit, respectively integrated (FIG. 2A) and not integrated (FIGS. 2B and 2C), forming part of a system as shown in FIG. 1;

FIG. 3. is an example of a timing chart of the raw measurement data, here in the form of timestamped pulses, read by a sensor, between two uplink transmission operations (messages or telegrams sent at times $TE_{-1}$ and TE by a radio module), in a context of remote reading of volume consumption, where a packet PAj comprises N timestamped pulses;

FIG. 4 is an example of the structure of a message transmitted by the radio module of a sensor as shown in FIGS. 2A, 2B and 2C.

DETAILED DESCRIPTION OF THE INVENTION

Figure 1:
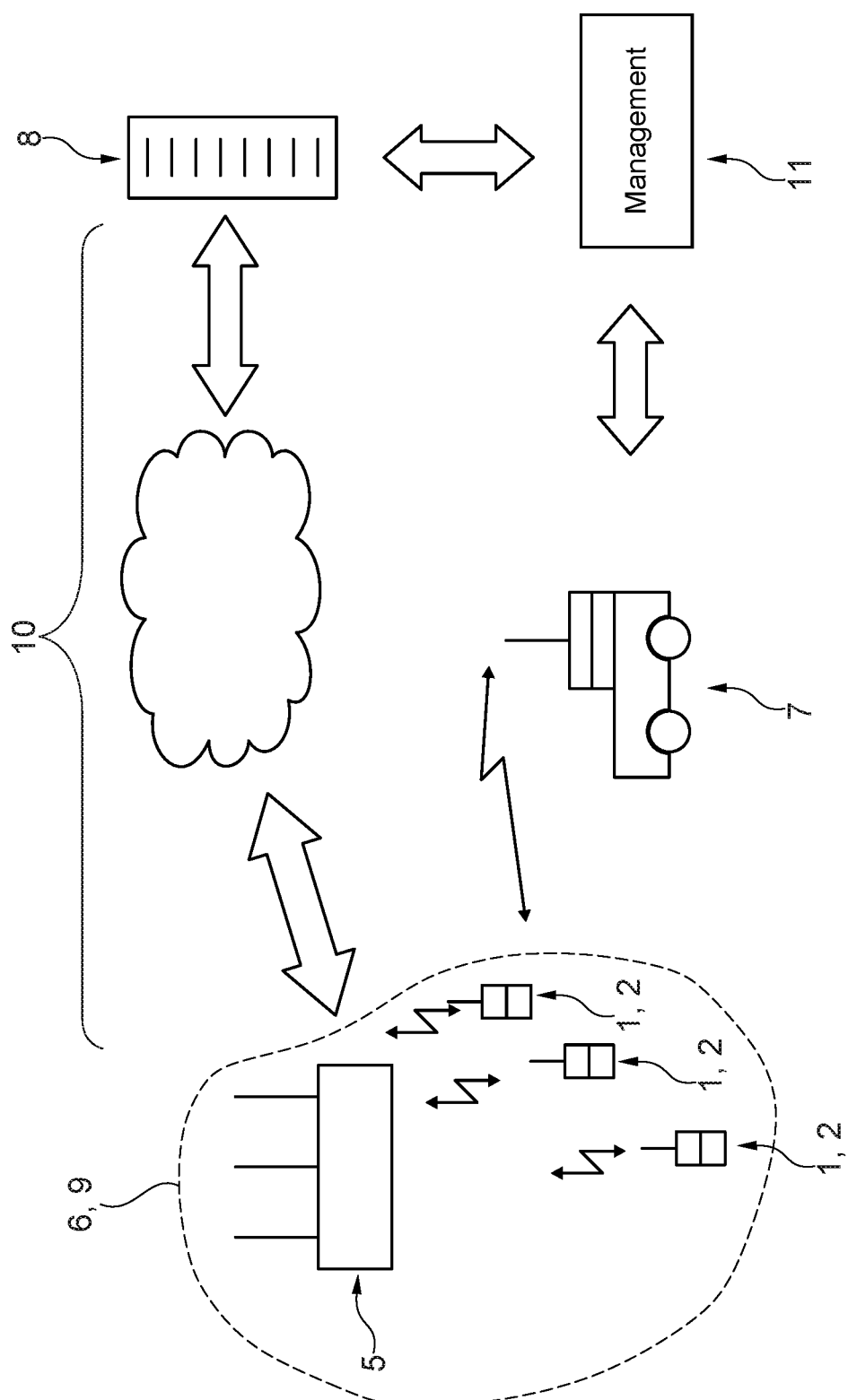
FIG. 1 is a schematic view of an exemplary remote reading system for carrying out the method according to the invention.

Referring now to the figures of the drawing in detail and first, particularly, to FIG. 1 thereof, the first subject-matter of the invention is a method for collecting data supplied by measurement sensors 1, installed locally and associated with radiofrequency communication means 2. The latter are integrated into the respective sensors 1, thus making up a unitary whole in FIG. 2A), or forming remote modules in FIGS. 2B and 2C.

The sensors 1 and/or the modules 2 include means 3 for storing and processing the read values, for the purpose of their transmission, and also an autonomous power supply source 4 for said sensor 1 and said communication means 2.

The various devices and components which this method can employ for its implementation are shown, by way of example, in FIGS. 1 to 5.

According to the invention, this method consists at least in:

reading, from each sensor 1 concerned, successive measurement data corresponding to timestamped elementary units of measurement PUi of at least one physical or physico-chemical quantity or parameter, supplied by said sensor 1, storing these raw measurement data PUi in the storage means 3 of said sensor 1 or of said module 2, transmitting these data PUi in their current state via a radiofrequency channel and in compressed form in a repetitive and conditional manner, each time after a predetermined time interval has elapsed and/or after a predetermined quantity of accumulated compressed raw measurement data PUi has been reached since the preceding transmission, and collecting, storing and using the data transmitted by a plurality of sensors 1 in a remote centralized processing installation 8.

By means of the invention, it is thus possible, in the reception site, to have the information allowing a faithful and integral reconstruction of the set of raw measurement data supplied by the different sensors 1 and enabling an unlimited flexibility for the use of said data. It is thus possible to take account simply and centrally of the scalability of the "business" functions without affecting the mode of operation or, a fortiori, the formation of the units [sensors 1/communication means 2].

The formation of the sensor 1 may consequently be simpler and its operation more reliable, and the energy consumption of the sensor 1/communication means 2 unit is lower, than current implementations using the data locally.

Finally, the implemented transmission does not necessarily have to be bidirectional, except, for example, in the case where the time of transmission of a sensor 1 needs to be controlled.

The person skilled in the art will obviously understand that the invention may be applied to the measurement and remote reading of a very wide variety of parameters and quantities: it suffices to be able to date precisely an elementary variation (measurable by the sensor) in this parameter or quantity, in accordance with the resolution of the sensor 1 concerned (the timestamped elementary variation may correspond to the resolution of the sensor or possibly to a multiple of this resolution).

When the measured quantity or parameter can also change in a decremental manner, the raw measurement data PUi are timestamped and signed elementary units of measurement (positive or negative units).

In relation to one advantageous application of the invention, associated with the notion of consumption, it can also be provided that the or one of the measured physical quantities relates to a flowing fluid, each timestamped raw measurement datum PUi corresponding to an elementary quantity of fluid measured by the sensor 1, as a function of its measurement accuracy. The measured fluid may, for example, be gas, water, fuel or a chemical substance.

Alternatively or cumulatively with the embodiment variant mentioned above, the invention may also provide that the or one of the measured physico-chemical quantities is chosen from the group formed by the temperature, pH, conductivity and pressure of a fluid passing through or contacted by the sensor concerned.

Furthermore, alternatively or cumulatively, when at least one parameter is measured, this parameter or one of these measured physical or physico-chemical parameters may indicate the quality and/or the composition of a fluid passing through or contacted by the sensor 1 concerned, such as, for example, turbidity, presence of pollutants or presence of solid and/or gaseous fraction(s).

The quantities and the parameters indicated above are obviously non-limiting examples only.

According to one practical embodiment, shown, in particular, in FIG. 3, each raw measurement datum consists of a timestamped pulse PUi.

In order to allow the method according to the invention to be adapted according to the modifications in the development of the measured parameter or quantity, while maintaining a satisfactory refresh of the available instantaneous data, the method advantageously consists in performing a new data transmission, in message or telegram form, as soon as at least one of the following two conditions is fulfilled:
 a) elapsing of a predetermined time interval, and
 b) reaching a predetermined quantity of accumulated compressed data since the preceding transmission.

The application of the aforementioned condition b) may, for example, consist in regularly checking, after a predetermined number of new raw data have been read, the size of this set of said new data in the compressed state.

When this size is close to a critical size, for example the size of a packet defined by the transmission protocol, a new transmission operation is performed (condition b) verified before condition a)), unless the predefined time limit between two successive transmissions has first been reached (condition a) verified before condition b)).

Thus, as shown schematically in FIG. 1, the method preferably consists in transmitting, via a radiofrequency channel when at least one of the conditions is fulfilled (on exception, they may be fulfilled simultaneously), the compressed and formatted raw data of each sensor 1 concerned either to a fixed concentrator module 5, managing and interfacing with a local network 6 of a plurality of sensors which are associated with it and of which it manages the uplink transmissions at least, either directly to the processing installation 8, in particular as a function of the radiofrequency transmission technology used, the performance of the communication means 2 of the different sensors 1 and/or the respective locations of said sensors.

Insofar as possible, a solution will be sought which does not require the use of concentrator modules 5, or only for a part of a local network 6 or only for certain local networks 6 of a geographical area 9.

Nevertheless, in certain application contexts, the use of concentrator modules 5 will be necessary in order to achieve a sufficient transmission quality.

More precisely, in relation to the implementation of concentrator modules 5, the method may consist, in terms of processing, in compressing the stored raw measurement values and putting them into a format suitable for a radiofrequency transmission, in transmitting, when at least one of the conditions is fulfilled, said compressed and formatted data to a fixed concentrator module 5 forming part of a local wireless network 6, then in retransmitting said compressed and formatted data, together with the compressed and formatted data of each of the other sensors 1 forming part of the same network 6, for example via an Internet link 10, to a remote processing installation 8, such as a data center or similar, for the purpose of their centralized use.

The concentrator modules 5, which have an autonomous power supply or are powered via lines, may be modules dedicated to this function or may be shared (in which case they then perform other functions as well).

Certain sensors 1, via their module 2, may possibly act as concentrator modules for sensors 1 in the vicinity provided with transmission means which are more limited or are incompatible in terms of consumption.

Alternatively or cumulatively in relation to the aforementioned transmission modes, the method may also consist, for each sensor 1 concerned, in transmitting the compressed raw measurement data via a radiofrequency channel to a mobile radiofrequency remote reading unit 7 following reception of a corresponding request from the latter or automatically at regular intervals (FIG. 1).

This mobile unit 7 may either store the recovered data over a time interval (for example one day) and may then dump them to a processing site 8, or may retransmit them immediately and gradually to this site 8.

The raw measurement data recovered by the mobile unit 7 may not cover the entire period since the last passage of the unit. However, additional data, in particular basic information (for example alarms, a consumption index, etc.) may be transmitted simultaneously during each transmission from a given sensor 1 to the mobile unit 7.

It may even be provided, if necessary, during the proximal passage time of the mobile unit 7, to set up a bidirectional communication with the sensor 1 concerned for the exchange of additional information or to perform a parameterization or an update of said sensor 1.

Figure 5:
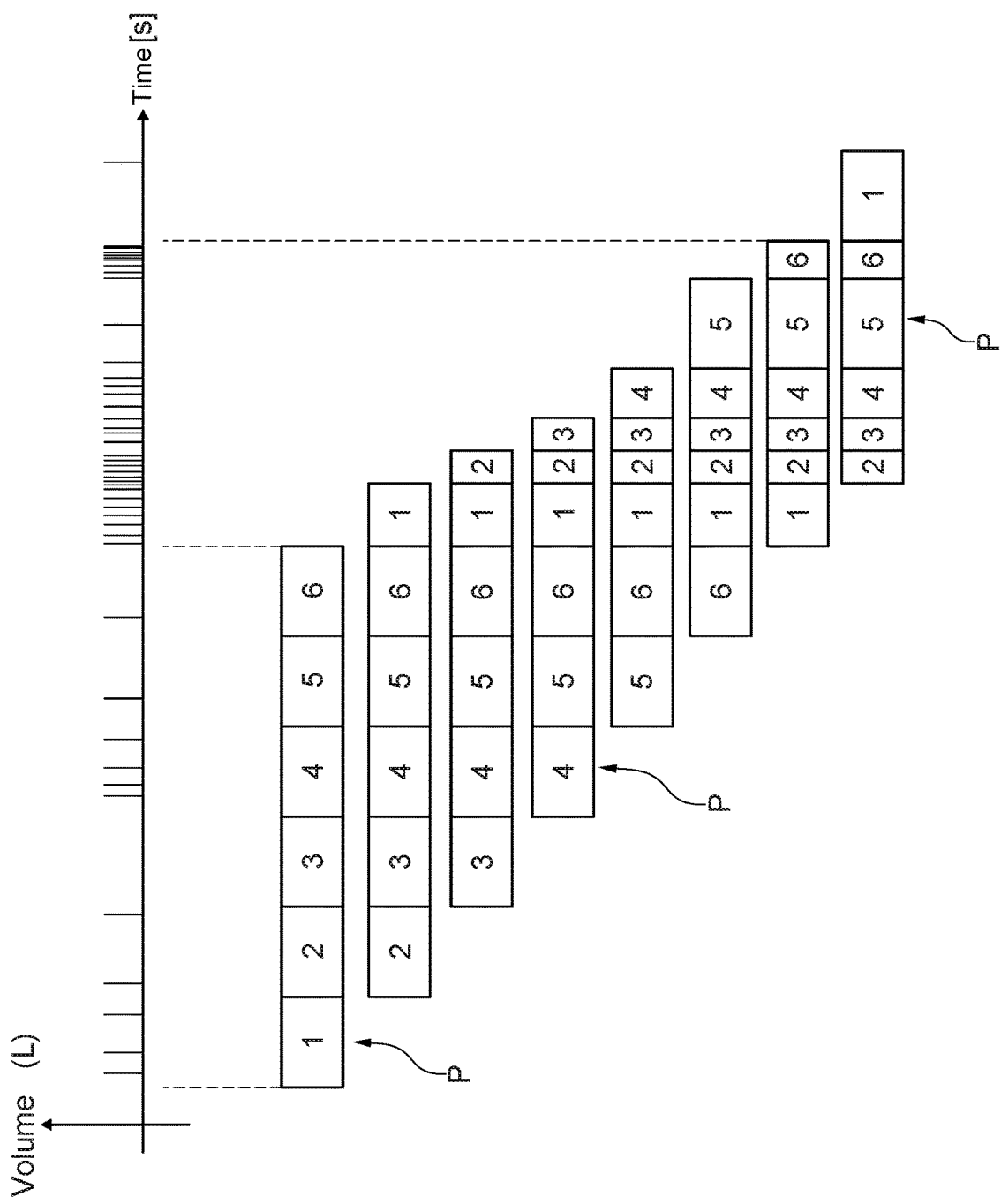
FIG. 5 is a timing chart showing the redundant transmission of the packets of timestamped raw measurement data according to one embodiment of the method according to the invention, with staggering of the packets according to a FIFO mode.

As shown in FIGS. 4 and 5 by way of example, it may be provided to prepare the compressed raw measurement data by formatting them into packets PAj, the size of which may not exceed a predetermined maximum value, a new transmission being initiated whenever the accumulated data attain the size of a packet PAj, unless the predetermined time interval has elapsed beforehand.

In order to be able to guarantee a reliable and integral recovery of the raw measurement data, even if the radio link quality is poor, the transmission of the data is performed with a redundancy, advantageously a multiple, for example at least triple, preferably at least quintuple, redundancy.

In accordance with one possible practical aspect of the invention presented in FIG. 5, the redundancy in the transmission may be implemented through repeated transmission of the same data packet PAj in a plurality of successive transmission operations, each transmission operation involving at least the last three, preferably at least the last five, formed packets PAj (FIG. 5 shows a redundancy of 5).

According to one variant of the invention, the compression of the raw data is implemented without loss.

According to a different variant of the invention, the compression of the raw data is implemented with a predetermined authorized loss level. In fact, when the user or operator prioritizes energy saving and accepts a certain inaccuracy in the reinstatement and recovery of the initial measurement data (i.e. accepts a certain loss), the compression rate can then be increased, at the expense of a reduced accuracy during the recovery at the receiving end. It may be provided that this loss rate or the compression rate represents a programmable or adjustable parameter, determining or parameterizing the compression mode.

By way of illustrative and non-limiting examples of data compression algorithms, it may be envisaged, in the context of the method according to the invention, to implement a differential coding (delta coding) associated with a Huffman coding, a run-length encoding (RLE) or, preferably, a context-adaptive binary arithmetic coding (CABAC).

Moreover, and also by way of an illustrative and non-limiting example, the protocol for the transmission of the raw measurement data from the sensors or counters 1 concerned may comply with the EN 13757 standard, advantageously with the EN 13757-3 part of the standard relating to the transport layer, with the EN 13757-4 part of the standard relating to the physical layer, the link and the frame format, and with the EN 13757-7 part of the standard relating to security, preferably with the application of mode 8.

As shown by way of example in FIG. 4, it can be provided to transmit, with the packets PAj of raw data PUi, also the identity I of the sensor 1 concerned and the absolute or accumulated value VA of the physical or physico-chemical quantity or parameter measured by the sensor 1 concerned, this value VA being timestamped or associated with one of the timestamped elementary measurement data PUi, for example a fluid counter index value.

The method may also consist in reading and transmitting, with the packets PAj of raw data PUi, the value at a determined time of at least one other physical or physico-chemical parameter PPC of the environment of the sensor 1 concerned or the fluid measured by said sensor, such as, for example, the conductivity of the fluid, the temperature of the fluid, the pH of the fluid, the pressure of the fluid, a parameter indicating the quality and/or the composition of the fluid and/or the temperature of the installation environment of the sensor 1.

Finally, in the remote centralized processing installation 8 comprising appropriate hardware and software means, said method may furthermore consist in implementing, on the one hand, following decompression, a use of said received raw measurement data for the purpose of reconstructing timing charts of the values associated with each of the sensors 1 and in performing business functions and, on the other hand, a cumulative storage of said raw data, and possibly of the data resulting from the processing operations, originating from all of the sensors 1 of the networks 6 connected to said installation 8 concerned, and timing charts of the corresponding values over a lengthy time period.

Through the collection and storage of all of the time-stamped and signed elementary measurement data (raw data) delivered by all of the sensors 1 of the network or of a given network, the invention enables all useful or desired types of evaluation, analysis, verification, monitoring and, more generally, processing and use, since the basic individual raw information is available.

Thus, in addition to the calculation of consumption and average flow at different levels (by sensor 1, by group of sensors 1 or in the network), the invention also allows, in a centralized manner, the implementation of a backflow detection, calculations of underflow or overflow, investigation of fraud and leakage, retrieval of the entire consumption history, etc.

Once more referring to the schematic illustration of FIG. 1, the subject-matter of the invention is also a system including, on the one hand, sensors 1, each including means 3 for the at least temporary storage and preparation of the raw measured values for the purpose of their transmission, or at least functionally associated with such means 3, and, on the other hand, at least one remote processing installation 8, such as a data center, capable of and intended for recovering, storing and using the raw data originating from the different sensors 1 of the geographical area 9 concerned, and from other areas covering an overall territory associated with said installation 8.

Radiofrequency communication means 2, integrated into the sensor 1 concerned or forming a separate and remote module, are associated with each sensor 1, and an autonomous power supply means 4 for the sensor 1 and the aforementioned communication means 2 is provided.

This system is capable of and intended for carrying out the method described above and is characterized in that the storage and processing means 3 of each sensor 1 or module 2 concerned include a microcontroller configured to implement a compression of the timestamped raw measurement data and their preparation in a format suitable for a radiofrequency transmission according to a determined protocol.

When the sensor 1 does not structurally form a unit or unitary whole with the radio module 2 (FIG. 2A), a plurality of alternative designs in two separate physical sub-units are possible (these sub-units being interconnected, for example, via a wire link for the communication and power supply), i.e.:

a first sub-unit combining the sensor 1, the memory 3, (and the preparation and processing means) and the cell or battery 4 and a second sub-unit corresponding to the single radio module 2 (FIG. 2B);

a first sub-unit reduced to the single sensor 1 and a second sub-unit including the radio module 2, the memory 3 (and the preparation and processing means) and the cell or battery 4 (FIG. 2C).

The processing, preparation and storage means 3 are preferably combined on one circuit or in one microcontroller or similar and, if necessary, can also perform the management of the radio module 2.

Furthermore, said at least one installation 8 comprises hardware and software means and is configured to implement, on the one hand, following decompression, a use of said received raw measurement data, for the purpose of reconstruction of the timing charts of the values associated with each of the sensors 1, and the performance of business functions and, on the other hand, a cumulative storage of the raw data and possibly the data resulting from the processing operations originating from all of the sensors 1 of the connected networks 6, and the corresponding profiles, over a lengthy time period.

Moreover, the aforementioned system may include, for the or each geographical area 9 in which the sensors 1 concerned are installed, a fixed concentrator module 5, forming, with the sensors 1 of the area 9 which is allocated to it, a wireless local network 6 of which it is the master and the sensors 1 are the slaves, said fixed concentrator module 5 also been connected, for example via an Internet link 10, to said at least one remote processing installation 8.

This design option implementing concentrator modules 5 over at least a part of a geographical area will be able to be implemented when a direct reliable transmission between the sensors 1 and the installation 8 is not possible, or when it requires an excessive consumption of the sensors 1.

This system advantageously also includes at least one mobile radiofrequency remote reading unit 7, for example installed in a motor vehicle, capable of and intended for collecting on-the-fly, during its passage close to a sensor 1 concerned, the raw measurement data, following the prior dispatch of a corresponding request from the mobile unit 7 to the sensor 1 concerned, or automatically at regular intervals.

The comments previously made in relation to a mobile remote reading method of this type remain valid.

Preferably, and in relation to one of the transmission repetition conditions, the storage means 3 of each sensor 1 form a buffer memory and are suitable and configured to store the content of a plurality of packets PAj of raw measurement data in the compressed state, the content or a part of the content of this buffer memory being transmitted with each uplink transmission from the sensor 1 concerned, preferably in a redundant manner as previously indicated.

The information collected by each mobile unit 7 is transmitted, directly or otherwise, to the processing installation 8 or management installation 11 of the owner and/or operator of the associated network of sensors 1 (and distribution network), which also defines the "business" functions to be implemented in said processing installation 8 (of which the resources and the stored data are made available to it).

Those of skill in the pertinent art will understand that the invention is not limited to the embodiments described and shown in the attached drawings. Modifications remain possible, particularly from the point of view of the formation of the various elements or through substitution of technical equivalents, yet without exceeding the scope of protection of the invention.

The invention claimed is:

1. A method for collecting data supplied by measurement sensors that are installed locally and equipped for radiofrequency communication by way of modules integrated into the sensors or forming remote modules, and wherein the sensors and/or the modules include a memory device for storing and preparing read values, and also an autonomous power supply source for the sensor and the modules, the method comprising:
   reading, from each sensor, successive measurement data corresponding to timestamped elementary units of measurement of at least one physical or physico-chemical quantity or parameter supplied by the sensor;
   wherein the timestamped elementary units of measurement delivered by the sensor correspond to a resolution or to a multiple of the resolution of a physical or physico-chemical quantity or parameter of the sensor;
   wherein each elementary unit of measurement consists of a timestamped pulse, wherein the elementary units of measurement are able to precisely date the measurement data;
   storing the measurement data as raw measurement data in the memory of the sensor or the module;
   preparing compressed raw measurement data by formatting the raw measurement data into packets of a predetermined fixed size and transmitting the compressed raw measurement data in a current state via a radiofrequency channel in a repetitive and conditional manner, if a predetermined time interval has elapsed and/or after accumulated data attain a size of a packet of accumulated compressed measurement data since a preceding transmission;
   in a remote, centralized processing installation, collecting and storing for further use the compressed raw measurement data, which was transmitted by the sensors; and
   in the remote centralized processing installation, which is implemented by hardware and software, decompressing the raw measurement data, cumulatively storing the raw measurement data, using the raw measurement data for reconstructing timing charts of values associated with each of the sensors, and using the raw measurement data for performing business functions.

2. The method according to claim 1, wherein the raw measurement data are timestamped and signed elementary units of measurement.

3. The method according to claim 1, wherein the measured physical quantities relate to a flowing fluid, and each timestamped elementary unit of measurement corresponds to an elementary quantity of fluid measured by the sensor, as a function of a measurement accuracy of the sensor.

4. The method according to claim 1, wherein the measured physico-chemical quantities are selected from the group consisting of temperature, pH, conductivity and pressure of a fluid passing through or contacted by the respective sensor.

5. The method according to claim 1, wherein the measured physical or physico-chemical parameters indicate a quality and/or a composition of a fluid passing through or contacted by the respective sensor.

6. The method according to claim 1, which comprises effecting a new data transmission, in message or telegram form, as soon as at least one of the following two conditions is met:
   a) elapsing of a predetermined time interval, and
   b) reaching a predetermined quantity of accumulated compressed data since the preceding transmission.

7. The method according to claim 6, which comprises transmitting, via a radiofrequency channel when at least one of the conditions is fulfilled, the compressed and formatted raw data of each respective sensor either to a fixed concentrator module, managing and interfacing with a local network of a plurality of sensors which are associated therewith and of which it manages the uplink transmissions at least, either directly to the processing installation, as a function of the radiofrequency transmission technology used, the performance of the communication means of the different sensors and/or the respective locations of the sensors.

8. The method according to claim 1, which comprises, for each respective sensor, transmitting the compressed raw measurement data via a radiofrequency channel to a mobile radiofrequency remote reading unit, either upon receiving a corresponding request from the remote reading unit or automatically at regular intervals.

9. The method according to claim 6, which comprises:
   preparing the measurement values by compressing the stored raw measurement values and putting the measurement values in a format suitable for a radiofrequency transmission;
   when at least one of the conditions is fulfilled, transmitting the compressed and formatted data to a fixed concentrator module forming part of a local wireless network;
   then retransmitting the compressed and formatted data, together with the compressed and formatted data of other sensors forming part of the same network to a remote processing installation for a centralized use thereof.

10. The method according to claim 1, which comprises transmitting the data with redundancy.

11. The method according to claim 10, which comprises implementing the redundancy in the transmission through repeated transmission of the same data packet in a plurality of successive transmission operations, each transmission operation involving at least the last three formed packets.

12. The method according to claim 1, which comprises compressing the raw data without loss.

13. The method according to claim 1, which comprises compressing the raw data with a predetermined authorized loss level.

14. The method according to claim 1, which comprises transmitting, with the packets of raw data, also the identity of the sensor concerned and the absolute or accumulated value of the physical or physico-chemical quantity or parameter measured by the sensor concerned, this value being timestamped or associated with one of the timestamped elementary measurement data, for example a fluid counter index value.

15. The method according to claim 1, which comprises reading and transmitting, together with the packets of raw measurement data, a value at a determined time of at least one other physical or physico-chemical parameter of a environment of the respective sensor or the fluid measured by the respective sensor.

16. The method according to claim 15, which comprises reading and transmitting a conductivity of the fluid, a temperature of the fluid, a pH of the fluid, a pressure of the fluid, a parameter indicating a quality and/or a composition of the fluid and/or a temperature of the installation environment of the sensor.

17. The method according to claim 1, wherein, the remote centralized processing installation also cumulatively stores data resulting from the processing operations, originating from all the sensors of networks connected to the remote centralized processing installation, and timing charts of corresponding values over a lengthy time period.

18. A system for a remote reading of sensors installed in a given geographical area, the system comprising:

a plurality of sensors, each having a device for storing and processing raw measured values for transmission functionally associated or integrated therewith;

wherein each said sensor is configured for providing successive raw measurement data corresponding to timestamped elementary units of measurement of at least one physical or physico-chemical quantity or parameter supplied by said sensor;

wherein the timestamped elementary units of measurement delivered by each said sensor correspond to a resolution or to a multiple of the resolution of a physical or physico-chemical quantity or parameter of said sensor;

wherein each said sensor is configured with built-in radiofrequency communication or by way of a separate and remote module associated with said sensor;

wherein said device for storing and processing of each said sensor or module includes a microcontroller configured to implement a compression of the raw measurement data and their preparation in a format suitable for a radiofrequency transmission according to a determined protocol, wherein each of the elementary units of measurement consists of a timestamped pulse, wherein the elementary units of measurement are able to precisely date the measurement data;

wherein said device for storing and processing is configured for preparing compressed raw measurement data by formatting the measurement data into packets of a predetermined fixed size and transmitting the data in a repetitive and conditional manner if a predetermined time interval has elapsed and/or after accumulated data attain a size of a packet of accumulated compressed measurement data since a preceding transmission;

an autonomous power supply for said sensor with said built-in radiofrequency communication of said module; and at least one remote processing installation, configured for acquiring, storing and using raw measurement data originating from said plurality of sensors of the geographical area concerned, and from other areas covering an overall territory associated with said installation;

said at least one remote processing installation including hardware and software configured to implement, on the one hand, following decompression, a use of the received raw measurement data, for reconstruction of timing charts of the values associated with each of the sensors, and the performance of business functions and, on the other hand, a cumulative storage of the raw data.

19. The system according to claim 18, which further comprises, for the geographical area in which the sensors are installed, a fixed concentrator module, forming, with the sensors of the given geographical area, a wireless local network with the concentrator module being a master and the sensors being slaves, said fixed concentrator module also being connected to the at least one remote processing installation.

20. The system according to claim 18, which further comprises at least one mobile radiofrequency remote reading unit, configured for collecting on-the-fly, during a passage close to a sensor, the raw measurement data, following the prior dispatch of a corresponding request from the mobile unit to the respective sensor, or automatically at regular intervals.

21. The system according to claim 18, wherein said device of each sensor forms a buffer memory and is configured to store a content of a plurality of packets of raw measurement data in the compressed state, a content or a part of the content of the buffer memory being transmitted with each uplink transmission from the respective sensor.

22. The system according to claim 18, wherein, said at least one remote centralized processing installation is also configured for cumulatively storing data resulting from the processing operations originating from all the sensors of networks connected to the remote centralized processing installation, and timing charts of corresponding values over a lengthy time period.

* * * * *